United States Patent
Chen et al.

(10) Patent No.: US 8,009,243 B2
(45) Date of Patent: Aug. 30, 2011

(54) LIGHT DIFFUSION DEVICE, BACKLIGHT MODULE AND LIQUID CRYSTAL DISPLAY

(75) Inventors: Ming-Lung Chen, Taoyuan County (TW); Chun-Chang Hung, Hsinchu (TW); Tai-Hao Chang, Changhua County (TW); Hsiu-Mei Fang, Kaohsiung (TW); Chiu-Chun Chen, Hsinchu County (TW)

(73) Assignee: AU Optronics Corporation, Hsinchu (TW)

( * ) Notice: Subject to any disclaimer, the term of this patent is extended or adjusted under 35 U.S.C. 154(b) by 179 days.

(21) Appl. No.: 12/188,180

(22) Filed: Aug. 7, 2008

(65) Prior Publication Data
US 2009/0296020 A1 Dec. 3, 2009

(30) Foreign Application Priority Data
May 30, 2008 (TW) .............................. 97120280 A

(51) Int. Cl.
*G02F 1/13357* (2006.01)
(52) U.S. Cl. .......................................... 349/64; 359/599
(58) Field of Classification Search .................... None
See application file for complete search history.

(56) References Cited

U.S. PATENT DOCUMENTS

| | | | |
|---|---|---|---|
| D52,503 S * | 10/1918 | Arndt | D26/123 |
| 1,370,885 A * | 3/1921 | Frederick et al. | 359/707 |
| D69,682 S * | 3/1926 | Wright | D26/123 |
| 6,231,200 B1 | 5/2001 | Shinohara et al. | |
| 6,606,133 B1 | 8/2003 | Okabe | |
| D493,566 S | 7/2004 | Yu et al. | |
| 7,102,824 B2 | 9/2006 | Clark et al. | |
| 7,255,456 B2 | 8/2007 | Yao et al. | |
| 7,367,759 B2 * | 5/2008 | Kozlowski | 409/132 |
| 2006/0152943 A1 | 7/2006 | Ko et al. | |
| 2008/0273143 A1* | 11/2008 | Yao et al. | 349/64 |
| 2009/0040425 A1* | 2/2009 | Chang | 349/64 |
| 2009/0147180 A1* | 6/2009 | Chang | 349/64 |

FOREIGN PATENT DOCUMENTS
WO WO 2006/116799 A1 * 11/2006
* cited by examiner

*Primary Examiner* — Mike Stahl
(74) *Attorney, Agent, or Firm* — Muncy, Geissler, Olds & Lowe, PLLC

(57) ABSTRACT

A light diffusion device including a light incident surface and a light exit surface is provided. The light exit surface has at least one light scattering pattern. A trajectory of the light scattering pattern is a continuous curve. The continuous curve is winded to form a plurality of closed patterns in sequence on the light exit surface, and two adjacent closed patterns at least overlap partly.

11 Claims, 4 Drawing Sheets

LIGHT DIFFUSION DEVICE, BACKLIGHT MODULE AND LIQUID CRYSTAL DISPLAY

CROSS-REFERENCE TO RELATED APPLICATION

This application claims the priority benefit of Taiwan application serial no. 97120280, filed on May 30, 2008. The entirety of the above-mentioned patent application is hereby incorporated by reference herein and made a part of specification.

BACKGROUND OF THE INVENTION

1. Field of the Invention

The present invention generally relates to a technique and application of an optical element and a light source module, in particular, to a light diffusion device, a backlight module, and a liquid crystal display.

2. Description of Related Art

Liquid crystal displays (LCD), having advantages such as thin thickness, high definition, low power consumption, and no radiation, have gradually become mainstream flat display apparatuses. Generally speaking, a liquid crystal display is constituted of a backlight module and an LCD panel. Since the LCD panel is not a self-emission panel, the backlight module is required to provide a uniform surface light source for the LCD panel to display images.

Generally speaking, in order to enable the backlight module to provide the uniform surface light source, normally, several light diffusers are employed to diffuse a spot or linear light source in the backlight module into the uniform surface light source. Further, in order to avoid greatly reducing the brightness of the surface light source caused by the light diffusers, usually, brightness enhancement films are disposed between the light diffusers to enhance the overall brightness of the surface light source.

However, in the prior art, the light diffusers are surface roughened, added with diffusing particles, or surface roughened with the diffusing particles added so as to achieve the uniform light diffusion of the light source in the backlight module into the surface light source of the LCD panel. However, the concentrated light pattern cannot be formed in the above manners, and thus the brightness of the surface light source provided by the backlight module is insufficient. Thus, an optical film, such as the brightness enhancement film must be added to improve the light output quality, which results in the increase of the fabrication cost of the backlight module.

SUMMARY OF THE INVENTION

Accordingly, the present invention is directed to a light diffusion device, which works together with a light resource to provide uniform light output brightness.

The present invention is also directed to a backlight module, which adopts the aforementioned light diffusion device to provide a uniform light output effect, thereby reducing the number of the optical films in use, and further achieving the purpose of reducing the cost and the assembly thickness.

The present invention is further directed to a liquid crystal display, which adopts the aforementioned backlight module, thus having a higher display quality and lower fabrication cost, and meeting the design requirements of "light, thin, short, and small."

The present invention provides a light diffusion device, which includes a light incident surface and a light exit surface. The light exit surface has at least one light scattering pattern. A trajectory of the light scattering pattern is a continuous curve. The continuous curve is winded to form a plurality of closed patterns in sequence on the light exit surface, and two adjacent closed patterns at least overlap partly.

The present invention further provides a backlight module, which includes a light diffusion device and a light source. The light diffusion device has a light incident surface and a light exit surface. The light exit surface has at least one light scattering pattern. A trajectory of the light scattering pattern is a continuous curve. The continuous curve is winded to form a plurality of closed patterns in sequence on the light exit surface, and two adjacent closed patterns overlap partly. In addition, the light source provides light rays that enter the light diffusion device through the light incident surface, and exit from the light exit surface of the light diffusion device.

The present invention further provides a liquid crystal display, which includes a backlight module and an LCD panel. The backlight module includes a light diffusion device and a light source. The light diffusion device has a light incident surface and a light exit surface. The light exit surface has at least one light scattering pattern. A trajectory of the light scattering pattern is a continuous curve. The continuous curve is winded to form a plurality of closed patterns in sequence on the light exit surface, and two adjacent closed patterns overlap partly. In addition, the light source provides light rays that enter the light diffusion device through the light incident surface, and exit from the light exit surface of the light diffusion device. The LCD panel is disposed beside the light exit surface of the light diffusion device.

In an embodiment of the present invention, the light scattering pattern is a ridge protruding from the light exit surface or a trench depressed in the light exit surface.

In an embodiment of the present invention, the closed patterns are arranged in sequence along a direction, and each closed pattern is displaced by a fixed distance D with respect to a preceding closed pattern in the direction.

In an embodiment of the present invention, a maximum width of each closed pattern along the arrangement direction is W, and D<W.

In an embodiment of the present invention, W/D is an integer.

In an embodiment of the present invention, 20 μm≦W≦2000 μm.

In an embodiment of the present invention, the at least one light scattering pattern is a plurality of light scattering patterns arranged side by side, and a distance between two adjacent light scattering patterns is d, where 0 μm<d≦100 μm.

In an embodiment of the present invention, the backlight module further includes an optical film assembly that is disposed beside the light exit surface.

In an embodiment of the present invention, the LCD panel further includes an optical film assembly that is disposed between the light diffusion device and the LCD panel.

In view of the above, the present invention fabricates at least one light scattering pattern on the light diffusion device, such that the light diffusion device when used together with the light source can provide the uniform output light with higher brightness. Therefore, the backlight module adopting the above light diffusion device may reduce the number of the optical films in use and the assembly thickness. Similarly, the liquid crystal display adopting the above backlight module may have a higher display quality and lower fabrication cost, and meets the design requirements of "light, thin, short, and small."

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1C:
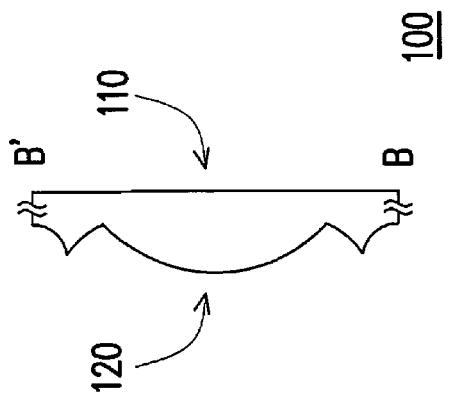
FIG. 1C is a schematic cross-sectional view of the light diffusion device taken along line BB' of FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 1A:
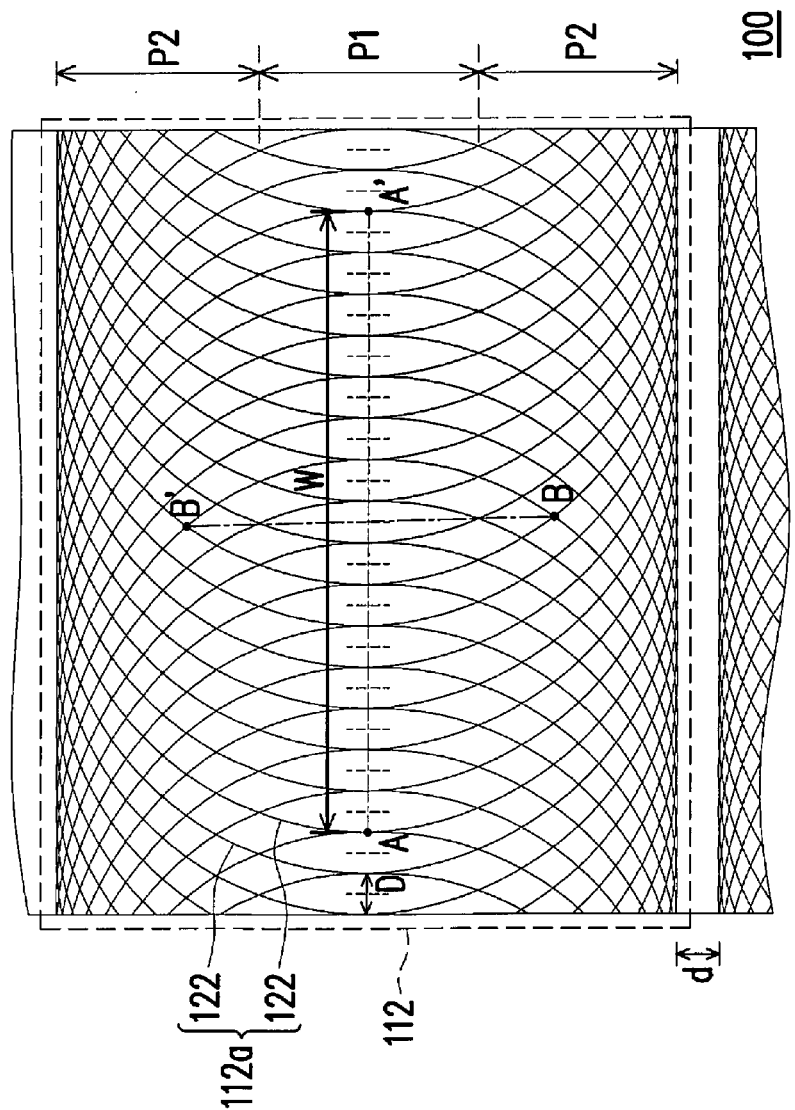
FIG. 1A is a partial top view of a light diffusion device according to an embodiment of the present invention.
Figure 1B:
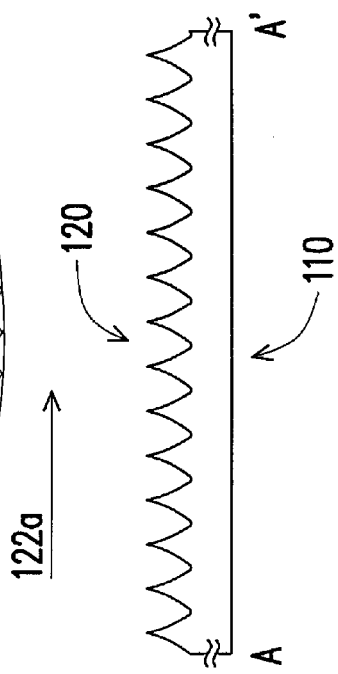
FIG. 1B is a schematic cross-sectional view of the light diffusion device taken along line AA' of FIG. 1.

FIG. 1A is a partial top view of a light diffusion device according to an embodiment of the present invention. FIG. 1B is a schematic cross-sectional view of the light diffusion device taken along line AA' of FIG. 1. FIG. 1C is a schematic cross-sectional view of the light diffusion device taken along line BB' of FIG. 1. Referring to FIGS. 1A, 1B, and FIG. 1C together, the light diffusion device 100 of this embodiment has a light incident surface 110 and a light exit surface 120. The light exit surface 120 has at least one light scattering pattern 112.

Figure 2:
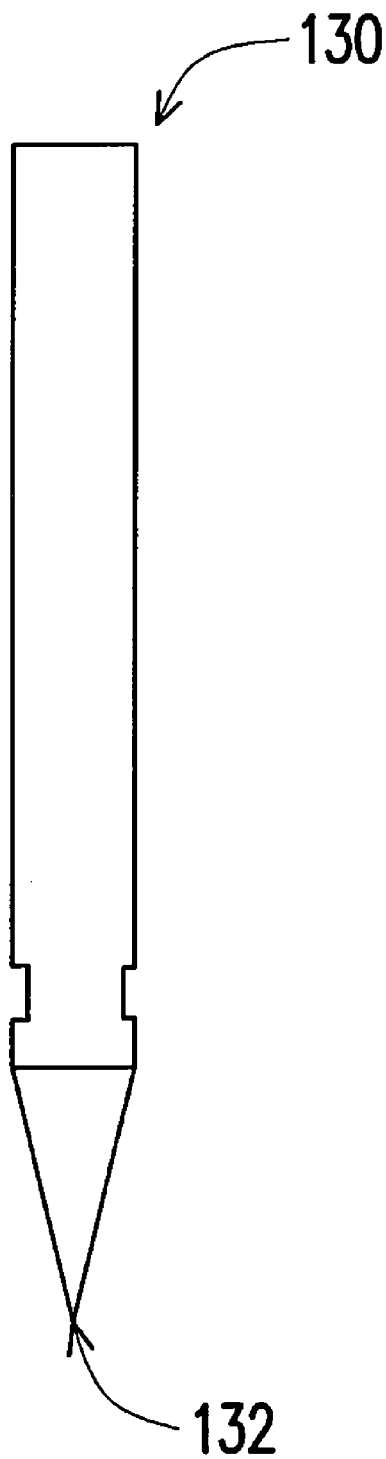
FIG. 2 is a schematic view of a cutting tool.

In this embodiment, a trajectory of the light scattering pattern 112 is a continuous curve 112a which is shaped in a combination of arcs, so the light scattering pattern 112 is formed by means of using a cutting tool 130 as shown in FIG. 2 to regularly and continually scribe a substrate along the continuous curve until the desired pattern is completed. It should be noted that the above fabricating method is described for illustration. In other embodiments, the cutting tool 130 may be used to engrave the light scattering pattern 112 on a mould (not shown), and then the light scattering pattern 112 is transferred to the substrate by means of injection-molding or other transfer-printing methods.

Since the light scattering pattern 112 may be formed on the substrate by using the cutting tool 130 to directly engrave the pattern or by other transfer methods, the light scattering pattern 112 may be a protrusion or a depression structure according to different forming methods. That is to say, the light scattering pattern 112 may be a ridge protruding from the light exit surface 120 or a trench depressed in the light exit surface 120.

In addition, the part indicated by the solid line in FIG. 1A is the path along which a tip 132 of the cutting tool 130 scribes. As shown in FIG. 1A, the path may be a clockwise winded scribe, and obviously, in other implementation aspects, the path may also be an anticlockwise winded scribe, or the combination thereof. The pattern formed by the winded scribe is approximately round, and obviously, may be oval or other shapes. FIG. 1A is only an example instead of the limitation to the present invention. In other words, the continuous curve 112a scribed by the cutting tool 130 is winded to form a plurality of closed patterns 122 in sequence on the light exit surface 120, and two adjacent closed patterns 122 overlap partly, as shown in FIG. 1A. Each of the closed patterns is in tangent to at least one of the other closed patterns at a tangent point.

In this embodiment, the closed patterns 122 formed by the winding of the continuous curve 112a are arranged in sequence along a direction 122a. Each closed pattern 122 is displaced by a fixed distance D with respect to a preceding closed pattern 122 in the direction, as shown in FIG. 1A. In addition, a maximum width of each closed pattern 122 along the direction 112a is W, where 20 μm≦W≦2000 μm, and preferably 20 μm≦W≦500 μm. The fixed distance D between two adjacent closed patterns 122 is smaller than the maximum width W of the closed patterns 122, as shown in FIG. 1A.

In detail, due to the aforementioned scribe trajectory of the cutting tool 130, the light scattering pattern 112 may be divided into a rice-like area P1 pattern between two adjacent tangent points and a pyramid-like area P2 pattern. When the maximum width W of the closed patterns 122 is an integer multiple of the fixed distance D between two adjacent closed patterns 122, the aforementioned complete rice-like structure and pyramid-like structure may be formed, as shown in FIG. 1A.

In addition, the light scattering pattern 112 may be designed into a combination of the maximum width W of different closed patterns 122 and the fixed distance D between two adjacent closed patterns 122 depending on the processing parameters of the cutting tool 130, so as to produce multiple combinations of variation of the outer curved surfaces and percentage to total area of the pyramid-like area P2 and rice-like area P1. Thus, a plurality of scattered light pattern can be provided so as to be applied in different backlight module designs.

It is worth mentioning that the range of the maximum width W of the closed patterns 122 is specified in this embodiment by taking the limitations in the practical processing of the cutting tool 130 into account. Furthermore, if the maximum width W of the closed patterns 122 exceeds the specified preferable range, for example, limited by the travel of the cutting tool 130 driven by a processing machine or the volume of the cutting tool 130, it is difficult to use the cutting tool 130 to process the substrate. Definitely, the light scattering pattern 112 formed by other processing methods (e.g., micro-processing methods such as a photolithography technique or laser engraving technique of a semiconductor process) is not limited to this.

Referring to FIG. 1A again, in this embodiment, the light scattering pattern 112 of the light diffusion device 100 is a plurality of light scattering patterns 112 arranged side by side, and a distance between two adjacent light scattering patterns 112 is d, where 0 μm<d≦100 μn, preferably 0 μm<d≦50 μm. The patterns of the light scattering patterns 112 arranged side by side may be the same, symmetrical, or different. That is to say, the light scattering patterns 112 arranged side by side may be winded in clockwise direction or anticlockwise direction. Definitely, in other embodiments (not shown), the light diffusion device 100 may also be the light diffusion device having only one light scattering pattern 112.

It is worth mentioning that a smaller distance d between two adjacent light scattering patterns 112 indicates a higher density of the light scattering pattern per area of the light exit surface 120, i.e., a higher percentage of the micro-structure to the total area of the light exit surface 120. Therefore, the better light-scattering effect is achieved when the light rays enter through the light incident surface 110 of the light diffusion device 100 and exit from the light exit surface 120. Furthermore, if the maximum width W of the closed patterns 122 is larger integer multiples of the fixed distance D between two adjacent closed patterns 122, it indicates that the density of the micro-structure on the same area of the light exit surface 120 is larger. In this situation, likewise, the light diffusion device 100 may provide uniform light rays. In other words, the outer curved surfaces and percentage to total area of the pyramid-like area P2 and rice-like area P1 of the light scattering pattern 112 on the light exit surface 120 may achieve the uniform light rays and more concentrated light rays due to the curved surface structures, thereby enhancing the brightness of the light.

In other embodiments (not shown), the light diffusion device 100 may turn the light scattering pattern 112 by 90 degrees to meet different design variations of the backlight module.

In addition, it is worth mentioning that since the tip 132 of the cutting tool 130 is in an acute shape, as shown in FIG. 2, during engraving, the micro-structure, for example, a tip of the pyramid-like area P2 and a ridge of the rice-like area P1 of the light scattering pattern 112 is sharp, as shown in FIG. 1B. However, if the light scattering pattern 112 is formed by the transferring methods such as the injection-molding, the transfer rate of the pattern may be intentionally reduced, so as to make the tip of the pyramid-like area P2 and the ridge of the rice-like area P1 become curved surfaces with rounded angles.

Figure 3A:
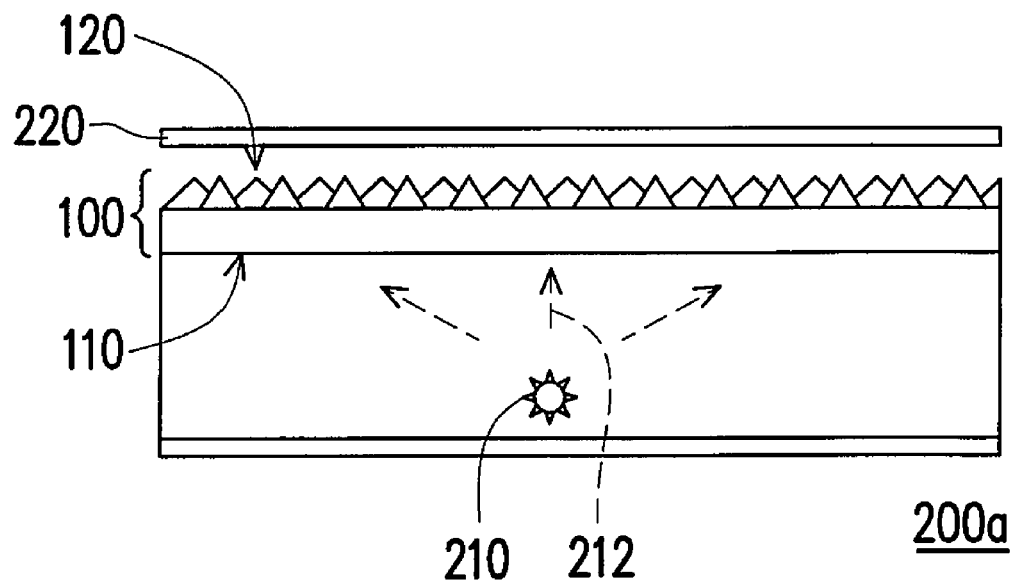
FIGS. 3A-3C are schematic cross-sectional views respectively illustrating different implementation aspects of a backlight module of the present invention.
Figure 3B:
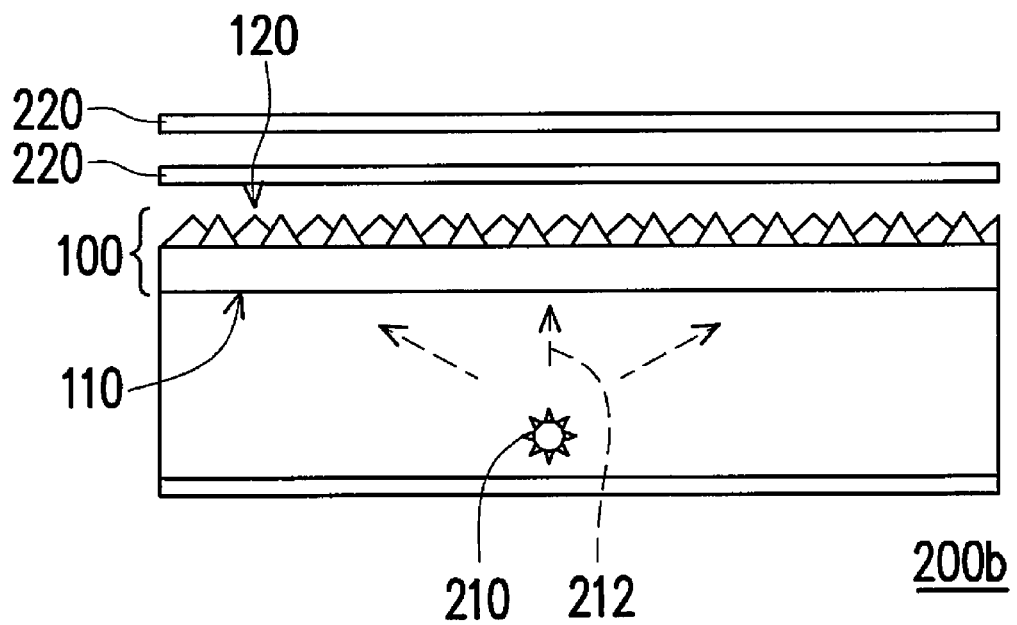
Figure 3C:
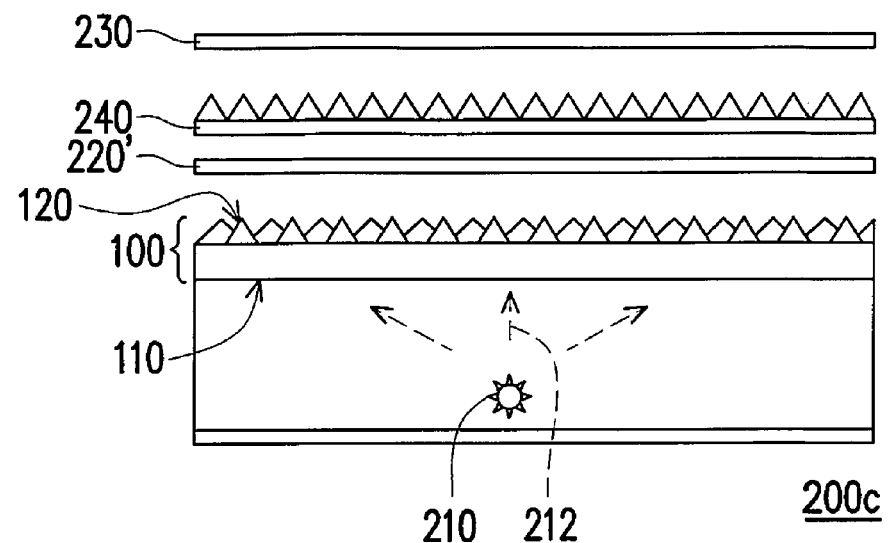

FIGS. 3A-3C are schematic cross-sectional views respectively illustrating different implementation aspects of a backlight module according to the present invention. Referring to FIG. 3A, the backlight module 200a of this embodiment adopts the aforementioned light diffusion device 100 and a light source 210. The illustration of the light diffusion device 100 has been described in the above and will not be repeated herein again. The light source 210 provides light rays 212 that enter the light diffusion device 100 through the light incident surface 110 of the light diffusion device 100 and exit from the light exit surface 120 of the light diffusion device 100.

Hereinafter, the difference concerning the output light brightness between the backlight module 200a adopting the light diffusion device 100 of the above embodiments and the backlight module adopting the conventional flat light diffuser will be illustrated.

In order to provide the uniform light source, the backlight module usually includes a light diffuser in addition to the flat light diffuser. Therefore, the backlight module 200a further includes a light diffuser 220, as shown in FIG. 3A.

As listed in Table 1, under the same test conditions, the conventional backlight module adopts a flat light diffuser and additionally a light diffuser, and produces the brightness scale of 134%. In this situation, if the flat light diffuser is replaced by the light diffusion device 100, the formed backlight module 200a may produce the brightness scale up to 154%. In other words, the light diffusion device 100 when used in the backlight module 200a may improve the performance of the output light brightness of the backlight module 200a.

TABLE 1

| Optical Element | Brightness Scale |
| --- | --- |
| Flat light diffuser | 100% |
| Flat light diffuser + light diffuser *1 | 134% |
| Light diffusion device + light diffuser *1 | 154% |

In another aspect of the embodiment, similarly, in order to provide more uniform light source, the conventional backlight module may include two light diffusers in addition to the flat light diffuser. Therefore, the backlight module 200b may include two light diffusers 220, as shown in FIG. 3B.

Likewise, under the same test conditions, the conventional backlight module adopts a flat light diffuser and two light diffusers, and produces the brightness scale of 152%, as listed in Table 2. In this situation, if the flat light diffuser is replaced by the above light diffusion device 100, the formed backlight module 200b may produce the brightness scale up to 164%, as listed in Table 2. In other words, the light diffusion device 100 when used to replace the flat light diffuser may improve the performance of the output light brightness of the backlight module 200b.

TABLE 2

| Optical Element | Brightness Scale |
| --- | --- |
| Flat light diffuser | 100% |
| Flat light diffuser + light diffuser *2 | 152% |
| Light diffusion device + light diffuser *2 | 164% |

In another aspect of the embodiment, in order to provide more uniform output light and enhanced output light brightness, the backlight module of the present invention may include a brightness enhancement film in addition to the flat light diffuser, upper light diffuser, and lower light diffuser. As shown in FIG. 3C, the backlight module 200c includes the light diffusion device 100, the light source 210, an upper light diffuser 230, a brightness enhancement film 240, and a lower light diffuser 220'.

Based on the above description, the backlight module 200a, 200b, or 200c adopting the light diffusion device 100 has higher output light brightness and meanwhile may provide the uniform light. Therefore, when meeting the design requirements, the optical films such as the upper light diffuser, lower light diffuser, or brightness enhancement film may be omitted to save the fabrication cost of the backlight module and reduce the assembly thickness. Meanwhile, the backlight module may maintain a certain output light quality.

Figure 4:
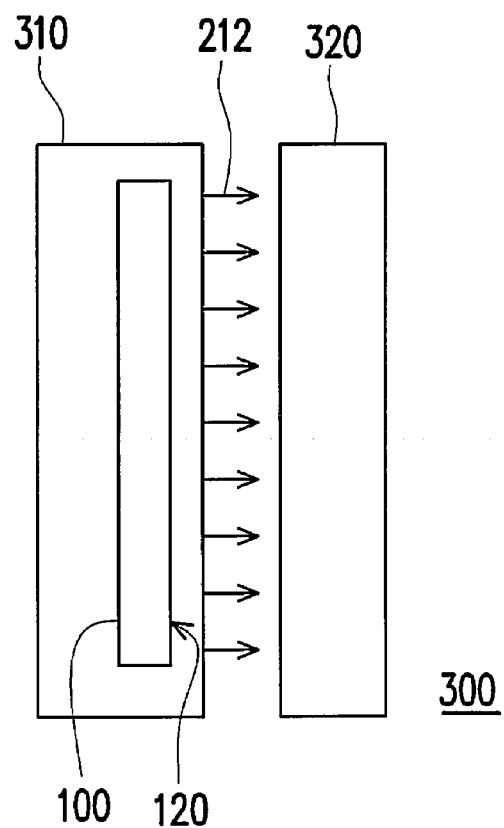
FIG. 4 is a schematic block view of a liquid crystal display according to an embodiment of the present invention.

FIG. 4 is a schematic block view of a liquid crystal display according to an embodiment of the present invention. Referring to FIG. 4, the liquid crystal display 300 includes a backlight module 310 and an LCD panel 320. The backlight module 310, for example, adopts the aforementioned backlight module 200a, 200b, or 200c, and the associated illustrated will not be described herein again. The LCD panel 320 is disposed beside the light exit surface 120 of the light diffusion device 100, so as to receive the light rays 212 exit from the light exit surface 120 and use the light rays 212 as the backlight source for display.

In this embodiment, the LCD panel 320, for example, adopts a transmissive display panel, a partially-transmissive display panel, a reflective display panel, a color filter on array display panel, an array on color filter display panel, vertical alignment (VA) display panel, an in-plane switching (IPS) display panel, a multi-domain vertical alignment (MVA) display panel, a twisted nematic (TN) display panel, a super-twisted nematic (STN) display panel, a pattern vertical alignment (PVA) display panel, a super-pattern vertical alignment (S-PVA) display panel, an advanced super-view (ASV) display panel, a fringe field switching (FFS) display panel, a continuous pinwheel alignment (CPA) display panel, an axially symmetric aligned microcell (ASM) display panel, an optical compensated birefringence (OCB) display panel, a super-in-plane switching (S-IPS) display panel, an advanced super-in-plane switching (AS-IPS) display panel, an ultra fringe-field switching (UFFS) display panel, a polymer-stabilized alignment display panel, a dual-view display panel, a triple-view display panel, three-dimensional display panel, or other panels, or any combinations thereof.

Since the backlight module 310 may enhance the brightness and output light of high uniformity, the liquid crystal display 300 adopting the backlight module 310 when displays images may provide better display quality. In fabrication, since the backlight module 310 may use less optical films, the liquid crystal display 300 has lower fabrication cost and reduced weight and thickness.

To sum up, the light diffusion device, the backlight module, and the liquid crystal display of the present invention at least has the following advantages. First, at least one light scattering pattern is formed on the light exit surface of the light diffusion device, such that the light diffusion device when used together with the light source may provide uniform output light. In addition, due to the above advantages, the light diffusion device when applied in the backlight module may reduce the number of the optical films, reduce the fabrication cost of the backlight module and the assembly thickness and weight, and improve the uniformity and brightness of the output light of the backlight module. Therefore, the liquid crystal display adopting the above backlight module can provide better display quality, and has lower fabrication cost, which meet the design requirements of "light, thin, short, and small."

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light diffusion device, having a light incident surface and a light exit surface, wherein the light exit surface has at least one light scattering pattern, a trajectory of the light scattering pattern is a continuous curve, the continuous curve is shaped in a combination of arcs and winded to form a plurality of closed patterns in sequence on the light exit surface, each of the closed patterns is in tangent to at least one of the other closed patterns at a tangent point to form a rice-like structure between two adjacent tangent points, and two adjacent closed patterns overlap partly, the closed patterns are arranged in sequence along a direction, and each closed pattern is displaced by a fixed distance D with respect to a preceding closed pattern in the direction, a maximum width of each closed pattern along the direction is W, and D<W, W/D is an integer, and wherein the at least one light scattering pattern is a plurality of light scattering patterns arranged side by side, and a distance between two adjacent light scattering patterns is d, where 0 µm<d≦100 µm.

2. The light diffusion device according to claim 1, wherein the light scattering pattern is a ridge protruding from the light exit surface or a trench depressed in the light exit surface.

3. The light diffusion device according to claim 1, wherein 20 µm≦W≦2000 µm.

4. A backlight module, comprising:
a light diffusion device, having a light incident surface and a light exit surface, wherein the light exit surface has at least one light scattering pattern, a trajectory of the light scattering pattern is a continuous curve, the continuous curve is shaped in a combination of arcs and winded to form a plurality of closed patterns in sequence on the light exit surface, each of the closed patterns is in tangent to at least one of the other closed patterns at a tangent point to form a rice-like structure between two adjacent tangent points, and two adjacent closed patterns overlap partly, the closed patterns are arranged in sequence along a direction, and each closed pattern is displaced by a fixed distance D with respect to a preceding closed pattern in the direction, a maximum width of each closed pattern along the direction is W, and D<W, W/D is an integer, and wherein the at least one light scattering pattern is a plurality of light scattering patterns arranged side by side, and a distance between two adjacent light scattering patterns is d, where 0 µm<d≦100 µm; and
a light source, providing light rays that enter the light diffusion device through the light incident surface, and exit from the light exit surface of the light diffusion device.

5. The backlight module according to claim 4, the light scattering pattern is a ridge protruding from the light exit surface or a trench depressed in the light exit surface.

6. The backlight module according to claim 4, wherein 20 µm≦W≦2000 µm.

7. The backlight module according to claim 4, further comprising an optical film assembly that is disposed beside the light exit surface.

8. A liquid crystal display, comprising:
a backlight module, comprising:
a light diffusion device, having a light incident surface and a light exit surface, wherein the light exit surface has at least one light scattering pattern, a trajectory of the light scattering pattern is a continuous curve, the continuous curve is shaped in a combination of arcs and winded to form a plurality of closed patterns in sequence on the light exit surface, each of the closed patterns is in tangent to at least one of the other closed patterns at a tangent point to form a rice-like structure between two adjacent tangent points, and two adjacent closed patterns overlap partly, the closed patterns are arranged in sequence along a direction, and each closed pattern is displaced by a fixed distance D with respect to a preceding closed pattern in the direction, a maximum width of each closed pattern along the direction is W, and D<W, W/D is an integer, and wherein the at least one light scattering pattern is a plurality of light scattering patterns arranged side by side, and a distance between two adjacent light scattering patterns is d, where 0 µm<d≦100 µm; and
a light source, providing light rays that enter the light diffusion device through the light incident surface, and exit from the light exit surface of the light diffusion device; and
an LCD panel, disposed beside the light exit surface of the light diffusion device.

9. The liquid crystal display according to claim 8, wherein the light scattering pattern is a ridge protruding from the light exit surface or a trench depressed in the light exit surface.

10. The liquid crystal display according to claim 8, wherein 20 µm≦W≦2000 µm.

11. The liquid crystal display according to claim 8, wherein the backlight module further comprises an optical film assembly that is disposed between the light diffusion device and the LCD panel.

* * * * *